(12) United States Patent
Islam et al.

(10) Patent No.: US 11,800,571 B2
(45) Date of Patent: Oct. 24, 2023

(54) CONFLICT AVOIDANCE IN RANDOM ACCESS CHANNEL (RACH) RESOURCES IN INTEGRATED ACCESS AND BACKHAUL (IAB) NETWORKS

(71) Applicant: QUALCOMM Incorporated, San Diego, CA (US)

(72) Inventors: Muhammad Nazmul Islam, Littleton, MA (US); Navid Abedini, Basking Ridge, NJ (US); Junyi Li, Fairless Hills, PA (US); Karl Georg Hampel, Hoboken, NJ (US); Jianghong Luo, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/368,047

(22) Filed: Jul. 6, 2021

(65) Prior Publication Data

US 2021/0337591 A1 Oct. 28, 2021

Related U.S. Application Data

(62) Division of application No. 16/409,400, filed on May 10, 2019, now Pat. No. 11,076,432.
(Continued)

(51) Int. Cl.
*H04W 74/08* (2009.01)
*H04W 72/04* (2023.01)
(Continued)

(52) U.S. Cl.
CPC ....... *H04W 74/085* (2013.01); *H04W 56/001* (2013.01); *H04W 72/0446* (2013.01);
(Continued)

(58) Field of Classification Search
None
See application file for complete search history.

(56) References Cited

U.S. PATENT DOCUMENTS 9,161,233 B2 10/2015 Wang et al.
10,313,066 B2 * 6/2019 You .................. H04W 28/0215
(Continued)

FOREIGN PATENT DOCUMENTS

WO 2011123527 A1 10/2011
WO 2013067693 A1 5/2013

OTHER PUBLICATIONS

Intel Corporation: "PHY Layer Enhancement for NR IAB", 3GPP Draft, 3GPP TSG RAN WG1 #93, R1-1806551, 3RD Generation Partnership Project (3GPP), Mobile Competence Centre , 650, Route Des Lucioles, F-06921 Sophia-Antipolis Cedex, France vol. RAN WG1, No. Busan, South Korea, May 21, 2018-May 25, 2018, May 20, 2018 (May 20, 2018), XP051441753, pp. 1-17, Retrieved from the Internet: URL:http://www.3gpp.org/ftp/Meetings%5F3GPP%5FSYNC/RAN1/Docs/ [retrieved on May 20, 2018] section 2.4.
(Continued)

*Primary Examiner* — Sai Aung
(74) *Attorney, Agent, or Firm* — Patterson & Sheridan LLP

(57) ABSTRACT

Certain aspects of the present disclosure provide techniques for avoiding conflicts of resources assigned to one or more signals with resources assigned to Random Access Channel (RACH) in an Integrated Access and Backhaul (IAB) network. Configurations for first and second sets of signals are obtained for a first and second base station (BS) respectively. Based on the obtained configurations, a RACH configuration is determined for the first BS for performing a RACH procedure with the second BS over a wireless backhaul link, wherein one or more Physical RACH (PRACH) occasions according to the determined RACH configuration do not
(Continued)

conflict with resources used for at least one of the first or the second set of signals. The determined RACH configuration is communicated to the second BS, wherein the second BS transmits a RACH signal to the first BS based on the determined RACH configuration.

20 Claims, 11 Drawing Sheets

Related U.S. Application Data

(60) Provisional application No. 62/690,021, filed on Jun. 26, 2018.

(51) Int. Cl.

| | | |
|---|---|---|
| *H04W 72/12* | (2023.01) | |
| *H04W 56/00* | (2009.01) | |
| *H04W 72/0446* | (2023.01) | |
| *H04W 72/1273* | (2023.01) | |
| *H04W 74/02* | (2009.01) | |
| *H04W 72/27* | (2023.01) | |

(52) U.S. Cl.
CPC ....... *H04W 72/1273* (2013.01); *H04W 72/27* (2023.01); *H04W 74/02* (2013.01)

(56) References Cited

U.S. PATENT DOCUMENTS

| | | | |
|---|---|---|---|
| 2003/0076812 A1* | 4/2003 | Benedittis | H04W 74/08 370/350 |
| 2012/0201229 A1 | 8/2012 | Feng et al. | |
| 2012/0300701 A1* | 11/2012 | Uemura | H04W 24/02 370/328 |
| 2013/0163535 A1* | 6/2013 | Anderson | H04L 1/0625 370/329 |
| 2013/0163536 A1* | 6/2013 | Anderson | H04L 5/0096 370/329 |
| 2015/0071198 A1* | 3/2015 | Deng | H04W 74/0833 370/329 |
| 2015/0078286 A1* | 3/2015 | Kim | H04L 1/18 370/329 |
| 2015/0181624 A1* | 6/2015 | Hwang | H04W 36/0005 370/329 |
| 2015/0319779 A1* | 11/2015 | Li | H04W 74/002 370/329 |
| 2016/0219570 A1* | 7/2016 | Guo | H04W 72/085 |
| 2016/0323834 A1 | 11/2016 | Rahman et al. | |
| 2017/0019930 A1 | 1/2017 | Lee et al. | |
| 2017/0048889 A1 | 2/2017 | Kadous et al. | |
| 2017/0223763 A1 | 8/2017 | Rahman et al. | |
| 2017/0231002 A1 | 8/2017 | Babaei et al. | |
| 2018/0041979 A1 | 2/2018 | Hampel et al. | |
| 2018/0092139 A1 | 3/2018 | Novlan et al. | |
| 2018/0324716 A1 | 11/2018 | Jeon et al. | |
| 2018/0324853 A1 | 11/2018 | Jeon et al. | |
| 2018/0359790 A1* | 12/2018 | Ingale | H04W 8/22 |
| 2019/0281587 A1 | 9/2019 | Zhang et al. | |
| 2019/0394799 A1 | 12/2019 | Islam et al. | |
| 2020/0389883 A1 | 12/2020 | Faxer et al. | |

OTHER PUBLICATIONS

International Preliminary Report on Patentability—PCT/US2019/033166, The International Bureau of WIPO—Geneva, Switzerland, dated Jan. 7, 2021.
International Search Report and Written Opinion—PCT/US2019/033166—ISA/EPO—dated Oct. 17, 2019.
Partial International Search Report—PCT/US2019/033166—ISA/EPO—dated Aug. 1, 2019.
3GPP TS 36.211: "3rd Generation Partnership Project, Technical Specification Group Radio Access Network, Evolved Universal Terrestrial Radio Access (E-UTRA), Physical channels and modulation (Release 12)", V12.3.0, Sep. 2014, pp. 1-124.
3GPP TS 36.331: "3rd Generation Partnership Project, Technical Specification Group Radio Access Network, Evolved Universal Terrestrial Radio Access (E-UTRA), Radio Resource Control (RRC), Protocol specification (Release 12)", V12.3.0, (Sep. 2014), pp. 1-378.

\* cited by examiner

CONFLICT AVOIDANCE IN RANDOM ACCESS CHANNEL (RACH) RESOURCES IN INTEGRATED ACCESS AND BACKHAUL (IAB) NETWORKS

CROSS-REFERENCE TO RELATED APPLICATION(S)

This application is a divisional application of U.S. application Ser. No. 16/409,400, filed on May 10, 2019, which claims priority to U.S. Provisional Application No. 62/690,021, entitled "CONFLICT AVOIDANCE IN RANDOM ACCESS CHANNEL (RACH) RESOURCES IN INTEGRATED ACCESS AND BACKHAUL (IAB) NETWORKS", filed on Jun. 26, 2018, which are expressly incorporated by reference in their entirety.

FIELD OF THE DISCLOSURE

Aspects of the present disclosure relate to wireless communications, and more particularly, to avoiding conflicts of resources assigned to one or more signals with resources assigned to Random Access Channel (RACH) in an Integrated Access and Backhaul (IAB) network.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or $5^{th}$ generation (5G) network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication. The method generally includes obtaining a first configuration of a first set of signals configured for a first Base Station (BS); obtaining a second configuration of a second set of signals configured for a second BS; determining, based on the obtained first and second configurations, a Random Access Channel (RACH) configuration for the first BS for performing a RACH procedure with the second BS over a wireless backhaul link, wherein one or more Physical RACH (PRACH) occasions according to the determined RACH configuration do not conflict with resources used for at least one of the first set of signals or the second set of signals; and communicating the determined RACH configuration to the second BS, wherein the second BS transmits a RACH signal to the first BS based on the determined RACH configuration.

Certain aspects of the present disclosure provide a method for wireless communication by a first Base Station (BS). The method generally includes transmitting a random access channel (RACH) configuration to a second BS; receiving a configuration of a set of signals configured for the second BS; determining as invalid, based on the received configuration, one or more Physical RACH (PRACH) occasions according to the RACH configuration of the first BS that conflict with resources used for at least one of the set of signals configured for the second BS; and receiving a RACH preamble from the second BS on a PRACH occasion not conflicting with resources used for at least one of the set of signals configured for the second BS.

Certain aspects of the present disclosure provide a method for wireless communications by a first Base Station (BS). The method generally includes obtaining a Random Access Channel (RACH) configuration to be used by a second BS for transmitting a RACH signal on at least one Physical RACH (PRACH) occasion according to the RACH configuration; determining at least one symbol after the at least one PRACH occasion as invalid for one or more downlink transmissions by the first BS to avoid interference from the RACH signal used by the second BS; and transmitting downlink signals based on the determination.

Certain aspects of the present disclosure provide a method for wireless communications by a User Equipment (UE) served by a first Base Station (BS). The method generally includes obtaining a Random Access Channel (RACH) configuration to be used by a second BS for transmitting a RACH signal on at least one Physical RACH (PRACH) occasion according to the RACH configuration; determining at least one symbol after the at least one PRACH occasion as invalid for one or more downlink transmissions by the first BS to the UE, to avoid interference to the downlink transmissions from the RACH signal used by the second BS; and receiving the downlink transmissions on one or more downlink symbols not determined as invalid.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
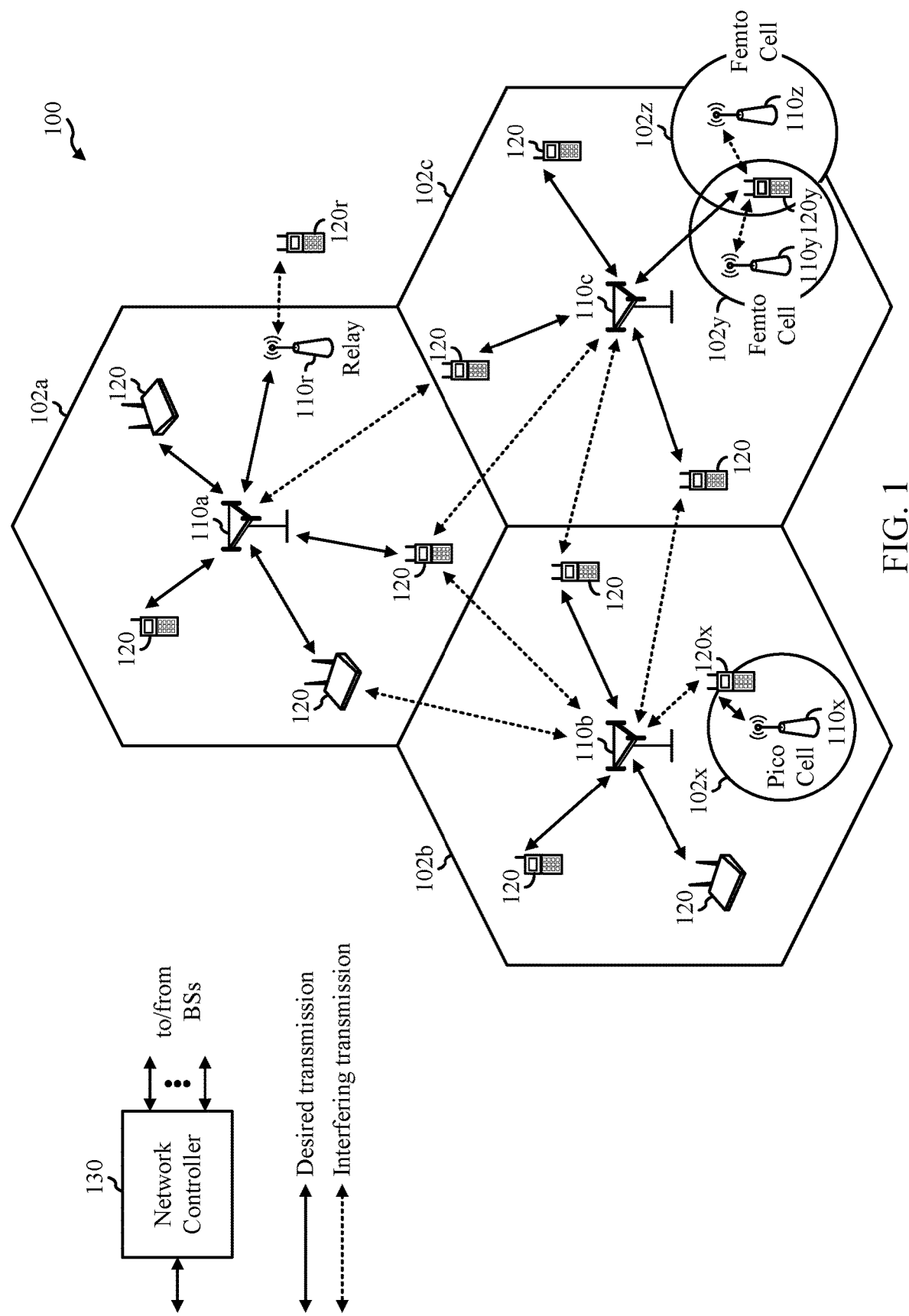
FIG. 1 is a block diagram conceptually illustrating an example telecommunications system, in accordance with certain aspects of the present disclosure.

With recent advancement in mmWave communication with highly directional beamforming, it is possible to replace the so called last-mile fibers for small BSs by establishing fixed mmWave backhaul links between the small BS and the macro BS equipped with fiber backhaul, also known as the anchored BS, thereby achieving Gigabits per second (Gbps) range data-rate over backhaul links. While mmWave fixed wireless backhaul is targeted to be a part of the first phase of the commercial rollout of 5G, 3GPP is proposing an integrated access and backhaul (IAB) network where the anchor BSs will use same spectral resources and infrastructure of mmWave transmission to serve cellular users in access as well as the small BSs in backhaul. An IAB network uses 5G mmWave communication to support an access network including access links between access nodes (ANs) and UEs, as well as a backhaul network including wireless backhaul links between ANs of the IAB network. In a typical IAB network resources (e.g., time and/or frequency resources) are shared between the access and backhaul networks/links.

In certain aspects, a gNB selects a Random Access Channel (RACH) configuration based on a DL/UL pattern configured for the gNB, such that there are sufficient Physical RACH (PRACH) resources (e.g., PRACH occasions) assigned to the uplink and flexible portions (e.g., UL and flexible symbols) of the DL/UL pattern. Different gNBs may have different configured DL/UL patterns resulting in different gNBs selecting different RACH configurations. In certain aspects, when a UE functionality of an IAB node (hereinafter referred to as UEF node) is being handed over from an access node functionality of a source IAB node (hereinafter referred as source ANF node) to an access node functionality of a target IAB node (hereinafter referred as target ANF node), the UEF node, as part of the handover, needs to transmit a RACH preamble to the target ANF node on PRACH resources configured by the target ANF node, in order to initiate a RACH procedure with the target ANF node. However, the UEF node and the target ANF node may have different configured UL/DL patterns, and the RACH configuration of the target ANF node may not be suitable for the UEF node. For example one or more PRACH occasions according to the RACH configuration of the target ANF node may conflict with resources (e.g., time and/or frequency resources) assigned for other signals transmitted by and/or received by the UEF node on an access link or backhaul link. In an aspect, each of the source and target ANF nodes may include an IAB donor node.

Certain aspects of the present disclosure describe techniques for avoiding conflicts of resources assigned to one or more signals with resources assigned to a Random Access Channel (RACH) in an Integrated Access and Backhaul (IAB) network.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. In an aspect, one or more base stations (BSs) 110 and one or more UEs 120 may form an Integrated Access and Backhaul (IAB) network. In an aspect, as shown in FIG. 1, each of the BSs 110 may be configured to perform operations related to avoiding conflicts between RACH signals and other signals in an IAB network, according to aspects described herein. In an aspect, each of the BSs 110 may also be configured to perform operations related to avoiding interference from RACH signals transmitted in a neighboring backhaul link in an IAB network, according to aspects described herein. In an aspect, as shown in FIG. 1, each of the User Equipments (UEs) 120 may be configured to perform operations related to avoiding interference from RACH signals transmitted in a neighboring backhaul link in an IAB network according to aspects described herein.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription.

A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network.

In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
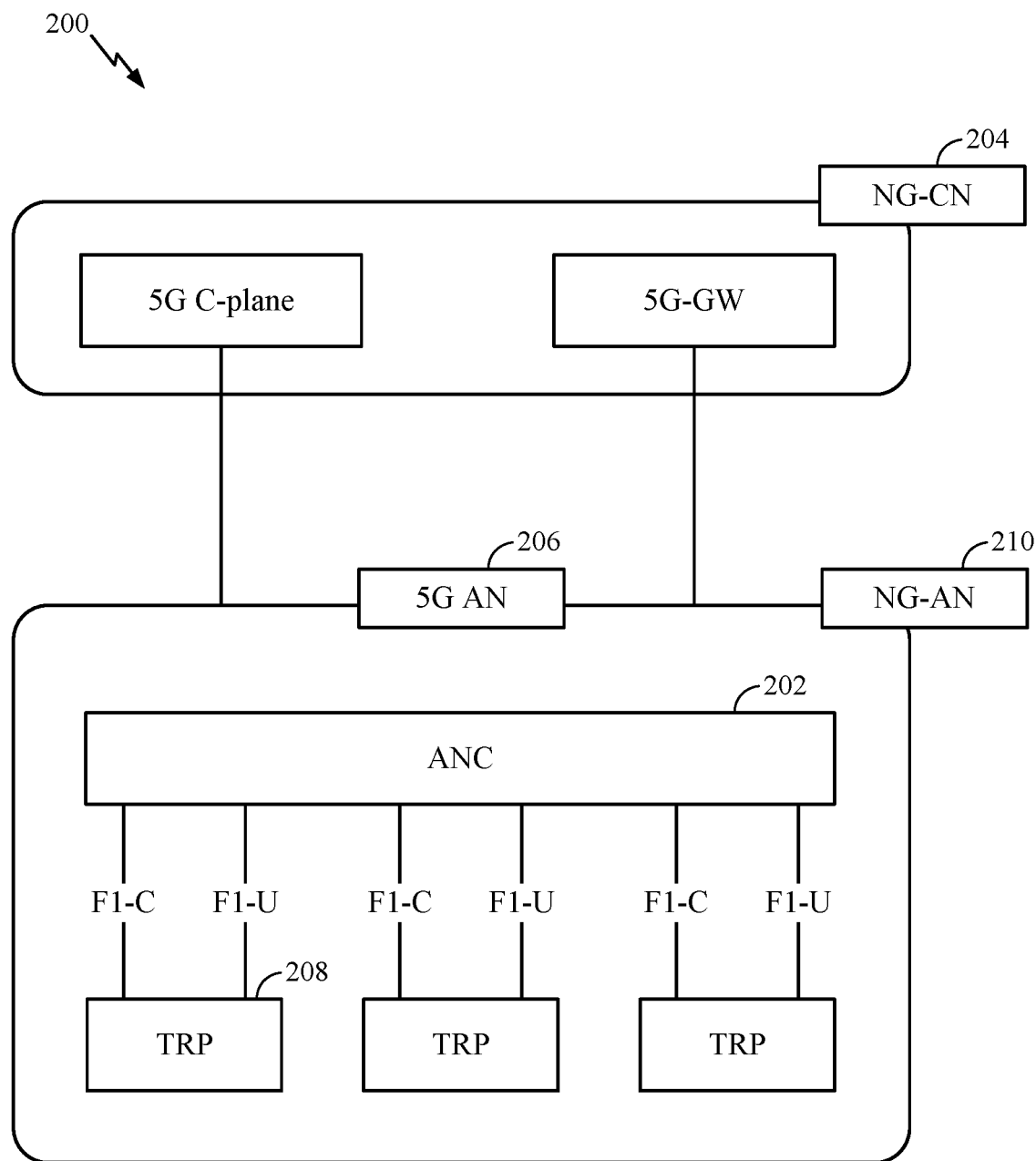
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

In an aspect, the 5G access node 206 may be part of an Integrated Access and Backhaul (IAB) network. In an aspect, at least one of the NG-CN 204 or the 5G access node 206 may be configured to perform operations related to avoiding conflicts between RACH signals and other signals in an IAB network, according to aspects described herein. In an aspect, 5G access node 206 may also be configured to perform operations related to avoiding interference from RACH signals transmitted in a neighboring backhaul link in an IAB network, according to aspects described herein.

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
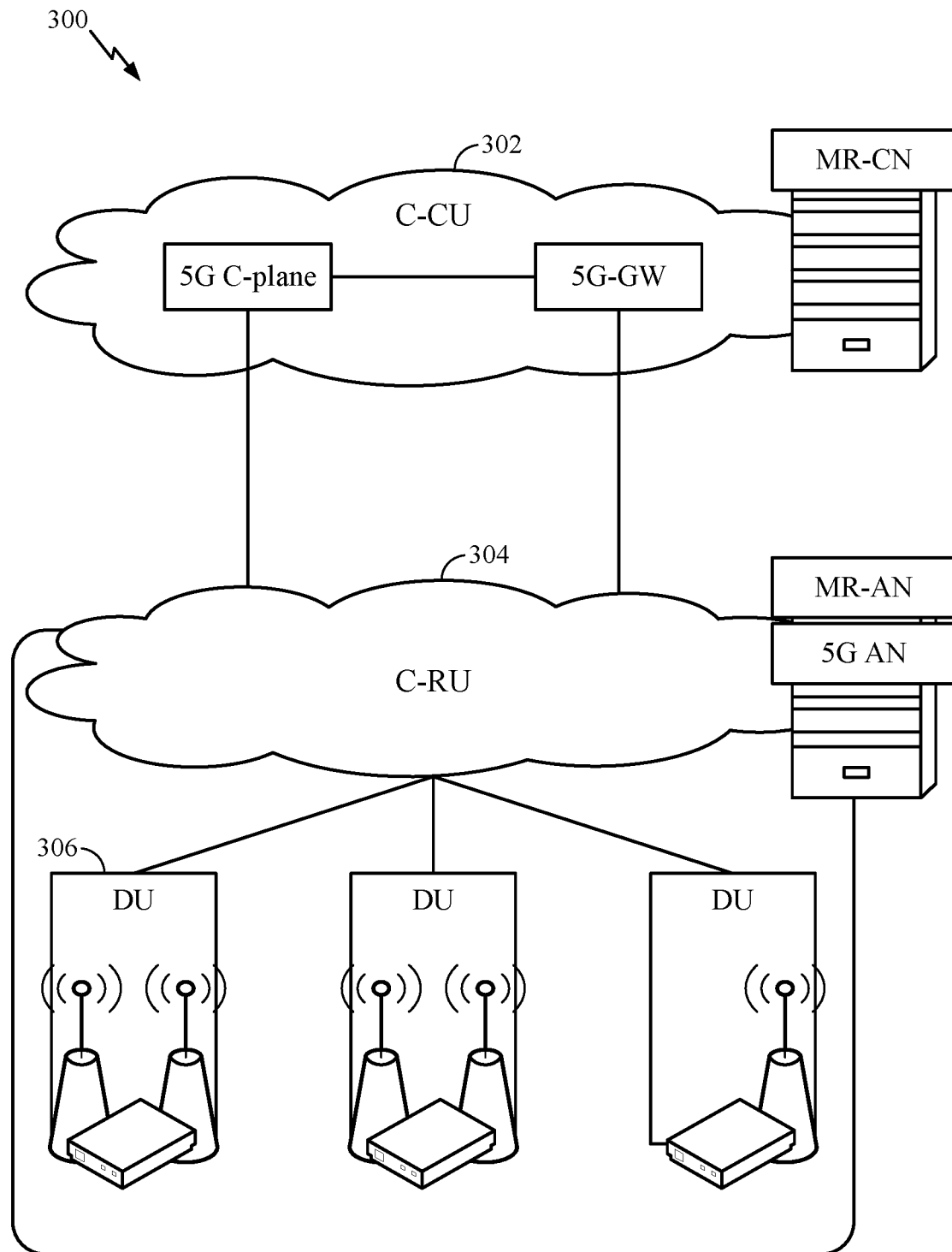
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
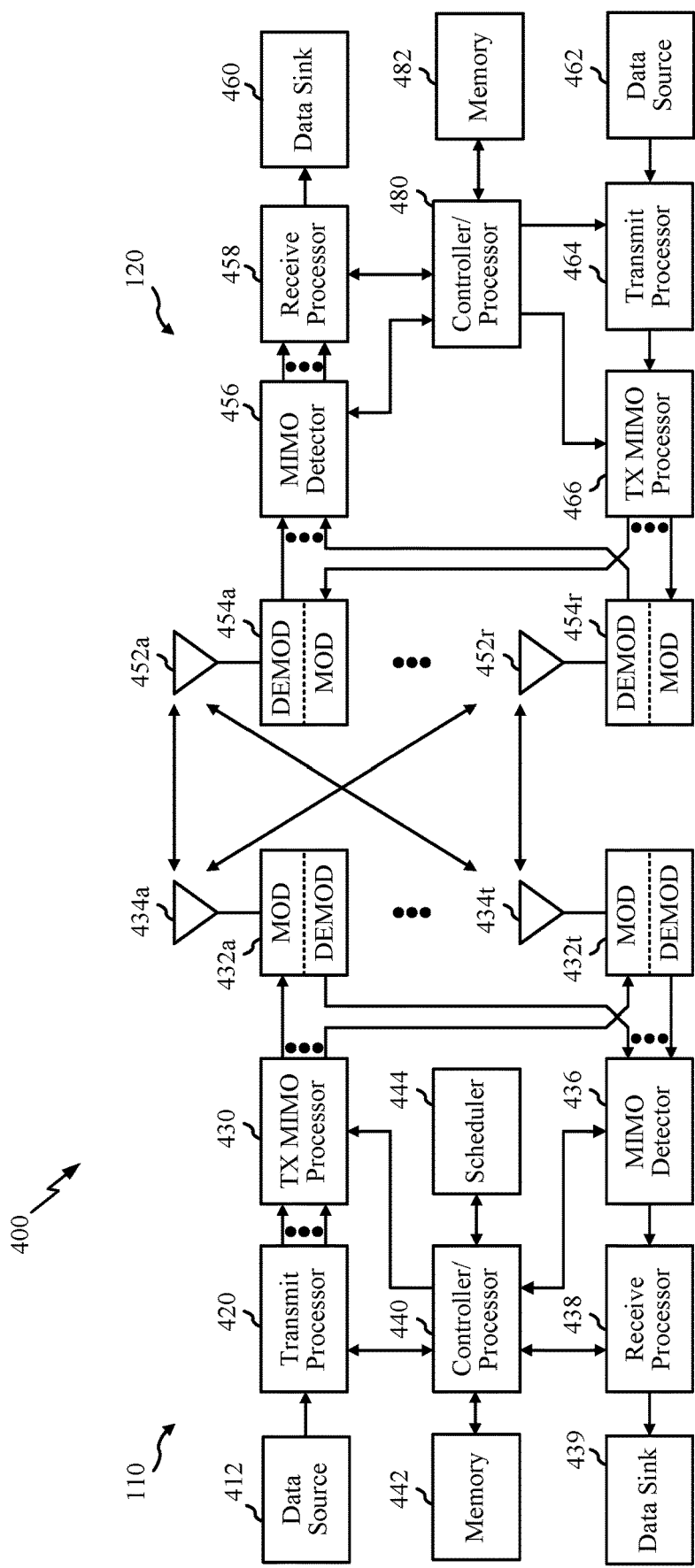
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 460, 438, and/or controller/processor 440 of the BS 110 may be used to perform the various techniques and methods described herein. In an aspect, the BS 110 and the UE 120 may be part of an Integrated Access and Backhaul (IAB) network. In an aspect, the BS 110 may be configured to perform operations related to avoiding conflicts between RACH signals and other signals in an IAB network, according to aspects described herein. In an aspect, the BS 110 may also be configured to perform operations related to avoiding interference from RACH signals transmitted in a neighboring backhaul link in an IAB network, according to aspects described herein. In an aspect, the UE 120 may be configured to perform operations related to avoiding interference from RACH signals transmitted in a neighboring backhaul link in an IAB network according to aspects described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
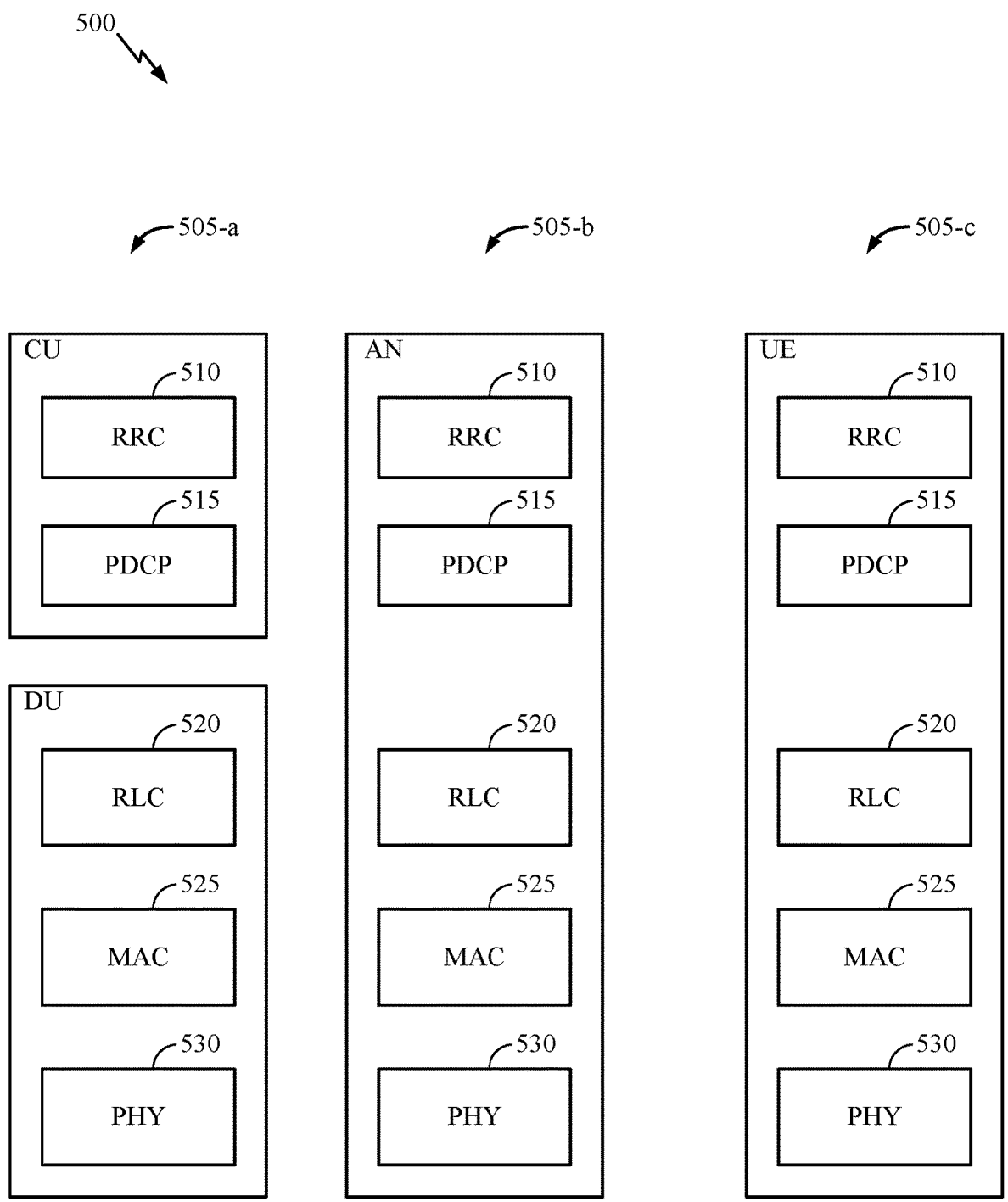
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
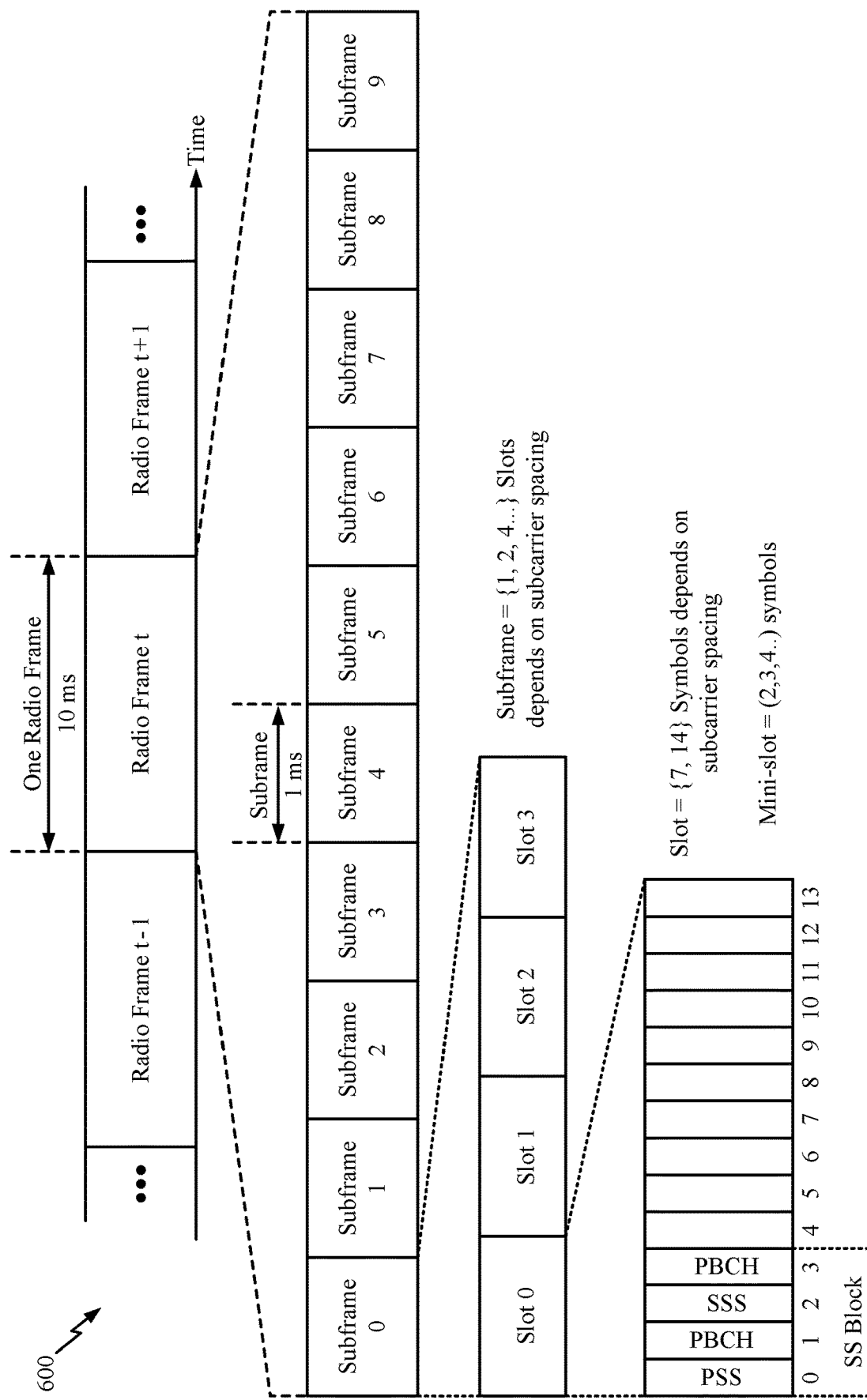
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Conflict Avoidance with Rach Resources in an IAB Network

With the exponential rise in data-demand far exceeding the capacity of the traditional macro-only cellular network operating in sub-6 GHz bands, network densification using mmWave base stations (BSs) is becoming a major driving technology for the 5G wireless evolution. While heterogeneous cellular networks (HetNets) with low power small BSs overlaid with traditional macro BSs improve the spectral efficiency of the access link (the link between a user and its serving BS), mmWave communication may further boost the data-rate by offering high bandwidth. That said, the HetNet concept never really turned into a massive real-time deployment since the existing high-speed optical fiber backhaul network that connects the BSs to the network core is not scalable to the extent of ultra-densification envisioned for small cells. However, with recent advancement in mmWave communication with highly directional beamforming, it is possible to replace the so called last-mile fibers for small BSs by establishing fixed mmWave wireless backhaul links between the small BS and a corresponding macro BS equipped with fiber backhaul, also known as the anchored BS, thereby achieving Gigabits per second (Gbps) range data-rate over the backhaul links. While mmWave fixed wireless backhaul is targeted to be a part of the first phase of the commercial rollout of 5G, 3GPP is proposing an integrated access and backhaul (IAB) network where the anchor BSs will use same spectral resources and infrastructure of mmWave transmission to serve cellular users in access as well as the small BSs in backhaul.

An IAB network uses 5G mmWave communication to support an access network including access links between access nodes (ANs) and UEs, as well as a backhaul network including wireless backhaul links between ANs of the IAB network. In a typical IAB, network resources (e.g., time and/or frequency resources) are shared between the access and backhaul networks/links.

Figure 7:
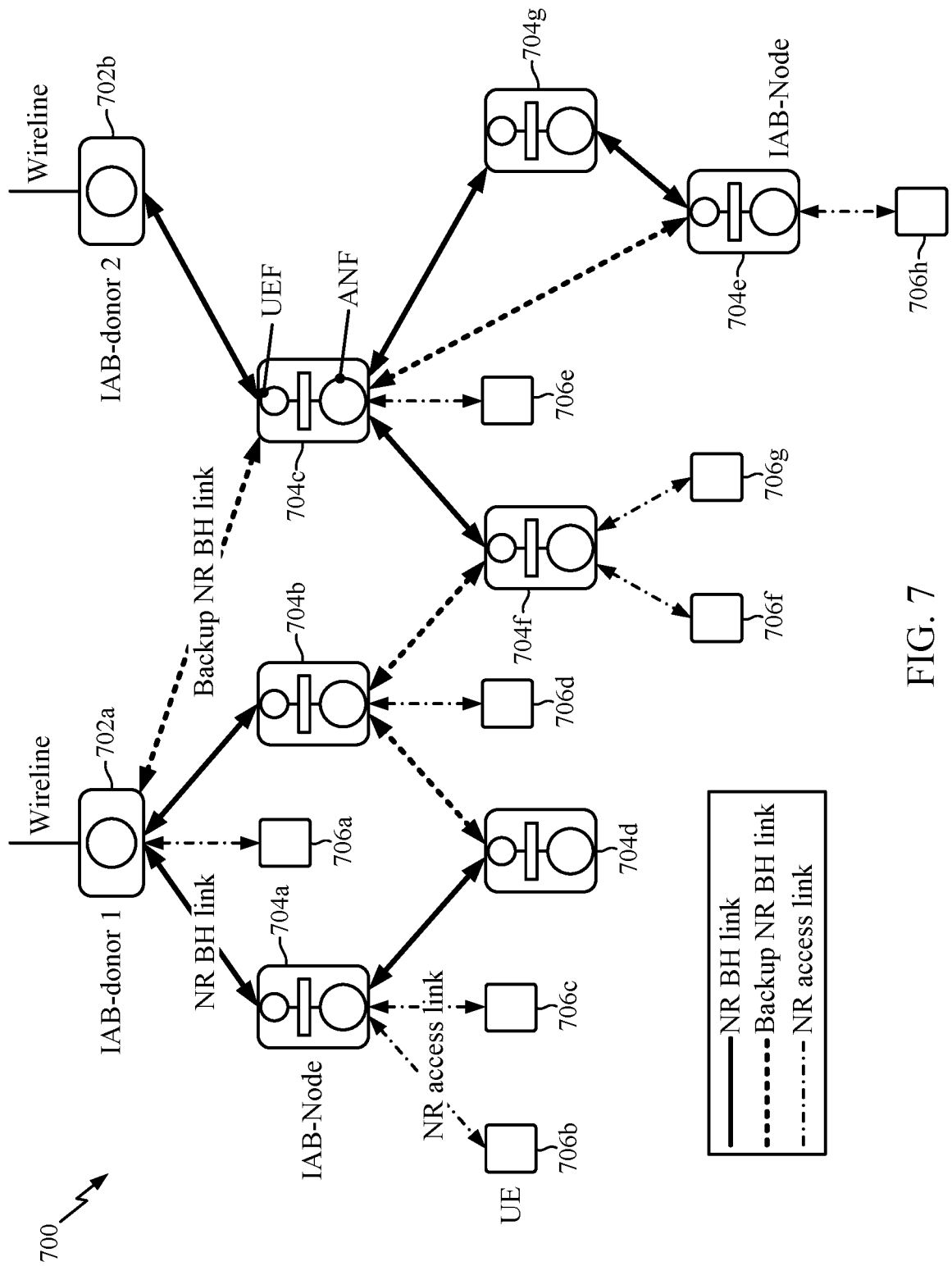
FIG. 7 illustrates an example IAB network 700 in which aspects of the present disclosure may be practiced.

FIG. 7 illustrates an example IAB network 700 in which aspects of the present disclosure may be practiced. As shown, the IAB network 700 includes one or more IAB donor nodes (e.g., 702a and 702b). An IAB donor node is a Radio Access Network (RAN) node (e.g., base station/gNB that terminates the NR Ng interface with the core network (e.g, next generation NG core)) and is generally connected to the core network via a wireline backhaul link. An IAB donor node 702 may also be referred to as an IAB anchor node and may include an IAB Central Unit (e.g., NR CU) or an IAB Distributed Unit (e.g, NR DU). The IAB network 700 further includes one or more non-donor IAB nodes (e.g., 704a-704g). Each IAB node (including donor and non-donor IAB nodes) may serve one or more UEs (e.g., 706a-706h) connected to the IAB node. As shown, the IAB nodes, including the donor IAB nodes 702, may be connected via NR wireless backhaul links or backup NR wireless backhaul links. Each IAB node connects to its served UEs via respective access links. Each IAB node is a RAN node (e.g., base station/gNB) that provides IAB functionality with two roles including an access node function (AN-F) and a UE function (UE-F). The AN-F of an IAB node is generally responsible for scheduling UEs (e.g., served by the IAB node) and other IAB nodes (e.g., that are connected as child nodes to the IAB node). The AN-F also controls both access and backhaul links under its coverage. The UE-F of an IAB node is controlled and scheduled by an IAB donor node or another IAB node as its parent IAB node. In an aspect, the IAB donor nodes 702 only include AN-F and no UE-F.

As noted above, both access links and wireless backhaul links use the same mmWave framework and share time and/or frequency resources.

It may be noted that the terms "configuring" and "scheduling" are interchangeably used throughout this disclosure.

In certain aspects, a gNB selects a Random Access Channel (RACH) configuration based on a DL/UL pattern configured for the gNB, such that there are sufficient Physical RACH (PRACH) resources (e.g., PRACH occasions) assigned to the uplink and flexible portions (e.g., UL and flexible symbols) of the DL/UL pattern. Different gNBs may have different configured DL/UL patterns resulting in different gNBs selecting different RACH configurations. In certain aspects, when a UE functionality of an IAB node (hereinafter referred to as UEF node) is being handed over from an access node functionality of a source IAB node (hereinafter referred as source ANF node) to an access node functionality of a target IAB node (hereinafter referred as target ANF node), the UEF node, as part of the handover, needs to transmit a RACH preamble to the target ANF node on PRACH resources configured by the target ANF node, in order to initiate a RACH procedure with the target ANF node. However, the UEF node and the target ANF node may have different configured UL/DL patterns, and the RACH configuration of the target ANF node may not be suitable for the UEF node. For example one or more PRACH occasions according to the RACH configuration of the target ANF node may conflict with resources (e.g, time and/or frequency resources) assigned for other signals transmitted by and/or received by the UEF node on an access link or backhaul link. In an aspect, each of the source and target ANF nodes may include an IAB donor node.

In an aspect, these other signals may include uplink and/or downlink signals associated with the UEF node on an access link and/or a backhaul link, including at least one of uplink transmissions, primary synchronization signals (PSS), secondary synchronization signals (SSS), PBCH signals, remaining system information, other system information, random access response from one or more UEs served by the UEF node, Channel State Information Reference Signals (CSI-RS), or paging signals.

In an example scenario, the UEF node 704f may receive an indication of a handover from a current source ANF node 704b to a target ANF node 704c. Target ANF node 704c and UEF node 704f may have different UL/DL patterns and the RACH configuration of the target ANF node 704c (e.g., based on its UL/DL pattern) may not be suitable for the UEF node 704f. In an aspect, all IAB nodes 704 managed by a particular IAB donor node 702 may have their RACH configurations configured such that their respective RACH configurations avoid conflicts with UL/DL signals of other IAB nodes 704 managed by the same IAB donor node 702, for example, regardless of the UL/DL patterns of the IAB nodes 704 being the same or different. However, for IAB nodes 704 that are managed by different IAB donor nodes (e.g., 702a and 702b) and having different UL/DL patterns, the RACH patterns of a first IAB node managed by a first IAB donor node may not be configured to avoid conflicts with other signals of a second IAB node managed by a second IAB donor node.

Referring to the above example scenario, UEF node 704f may be managed by the IAB donor node 702a and the ANF node 704c may be managed by the IAB donor node 702b. As a result, the RACH configuration of the ANF node 704c may not be configured to avoid conflicts with other UL/DL signals associated with the UEF node 704f. In this context, a RACH preamble transmitted on one or more PRACH occasion according to the RACH configuration of the ANF node 704c may conflict with one or more other signals associated with the UEF node 704f.

In an aspect, the UEF node 704f may support only one Radio Frequency (RF) chain, and as a result may transmit only or receive only at one time. Thus, if the ANF node 704c and UEF node 704f have different configured UL/DL patterns, one or more UL occasions according to the UL/DL pattern of the ANF node 704c may conflict with UL occasions according to the UL/DL pattern of the UEF node 704f. For example, when the UEF 704f node may be required to transmit a RACH signal to the ANF node 704c according to the UL/DL patter of the ANF node 704c, the UEF 704f node may need to monitor UL signals at the same time from its served UEs according to its own UL/DL pattern. Thus, one or more PRACH occasions configured by the ANF node 704c may conflict with other signals scheduled by the UEF node 704f (e.g., on an access link or backhaul link) at the same time.

Certain aspects of the present disclosure describe techniques for avoiding conflicts of resources assigned to one or more signals with resources assigned to a Random Access Channel (RACH) in an Integrated Access and Backhaul (IAB) network.

In certain aspects, for the example scenario discussed above, the RACH configuration of the target ANF node 704c may be adjusted based on a configuration of signals of the UEF node 704f, to not conflict with the signals of the UEF node.

Figure 8:
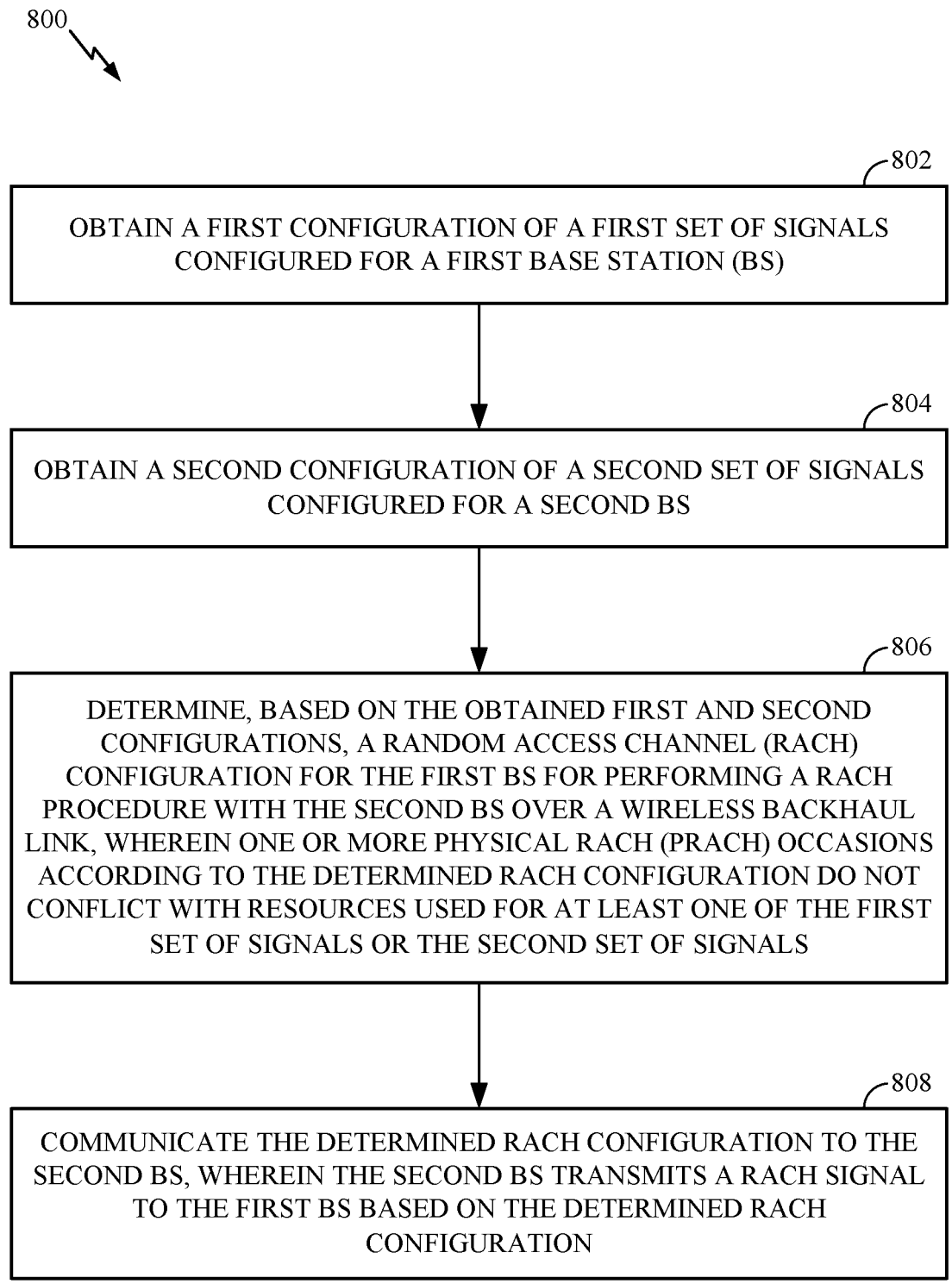
FIG. 8 illustrates example operations 800 performed by a network node or an IAB node for avoiding conflicts between RACH signals and other signals in an IAB network, in accordance with certain aspects of the present disclosure.

FIG. 8 illustrates example operations 800 performed by a network node or an IAB node for avoiding conflicts between RACH signals and other signals in an IAB network, in accordance with certain aspects of the present disclosure.

Operations 800 begin, at 802, by obtaining a first configuration of a first set of signals configured by a first BS.

At 804, a second configuration is obtained of a second set of signals configured for a second BS.

At 806, a RACH configuration is determined for the first BS, based on the obtained first and second configurations, for performing a RACH procedure with the second BS over a wireless backhaul link, wherein one or more PRACH occasions according to the determined RACH configuration do not conflict with resources used for at least one of the first set of signals or the second set of signals.

In an aspect, the first BS includes a target ANF node and the second BS includes a UEF node, wherein the UEF node is attempting to handover from a source ANF node to the target ANF node. In an aspect, the first and second set of signals includes at least one of uplink transmissions, a primary synchronization signal, a secondary synchronization signal, a PBCH signal, remaining minimum system information, other system information, random access response from one or more UEs, Channel State Information Reference Signals (CSI-RS), or paging signals.

At 808, the determined RACH configuration is communicated to the second BS, wherein the second BS transmits a RACH signal to the first BS based on the determined RACH configuration. In an aspect, the RACH signal includes a RACH preamble transmitted using one or more PRACH occasions according to the determined RACH configuration.

In an aspect, the operations 800 are performed by a network node including a network core (e.g., NGC) or an IAB donor node. In this context, the network may receive the first configuration of the first set of signals from the first BS via an IAB donor node managing the first BS. The network may receive the second configuration of the second set of signals from the second BS or another BS serving the second BS via an IAB donor node. In an aspect, an IAB donor node may receive the at least one of the first or second configurations over one or more hops using relay IAB nodes, and may forward the received configuration to the network core. In this context, the network receives the first and second configurations from the first and second BSs respectively, and determines a RACH configuration for the RACH procedure between the first and the second BS that does not conflict with transmissions of one or more of the signals associated with the first and/or second BS.

In an aspect, the resources used for the first set of signals or the second set of signals include time resources and/or frequency resources. For example, the determined RACH configuration configures one or more PRACH occasions to not conflict in time with transmission of one or more of the signals. That is, the PRACH occasions are configured on slots/symbols that are not scheduled for transmission of one or more of the other signals.

In an aspect, the second set of signals scheduled for the second BS include uplink transmissions by one or more UEs served by the second BS on an access link between the second BS and the one or more UEs. In this context, the determined RACH configuration includes one or more PRACH occasions that do not conflict with one or more of the UL transmissions scheduled by the second BS.

In an aspect, the second set of signals scheduled for the second BS include downlink transmissions by the second BS to one or more UEs served by the second BS on the access link between the second BS and the one or more UEs. In this context, the determined RACH configuration includes one or more PRACH occasions that do not conflict with one or more of the DL transmissions scheduled by the second BS.

In an aspect, the second BS may support a limited set of transmit beams at one time. Thus, if the second BS is scheduled to transmit one or more signals to served UEs using all of the limited set of beams, it may not be able to transmit a RACH preamble to the first BS. Configuration of PRACH occasions that do not conflict with the second BS's downlink transmissions avoids this conflict.

In an aspect, the operations 800 are performed by the first BS (e.g, the target IAB node). In this context, the first BS receives the second configuration of the second set of signals from a source BS serving the second BS or from the network. Thus, the first BS receives the second configuration from the second BS, and determines a RACH configuration for the RACH procedure between the first and the second BS that does not conflict with transmissions of one or more of the signals associated with the first and/or second BS.

In an aspect, the second BS proactively communicates information regarding its configuration (e.g., second configuration) to the first BS before the second BS attempts the RACH procedure with the first BS. In this context, the second BS may receive a new RACH configuration avoiding conflicts with the second BS's own transmissions, before it initiates the RACH procedure. This may increases the chances of the second BS successfully completing the RACH procedure and handing over to the first BS.

In an aspect, the second BS communicates information regarding its configuration (e.g., second configuration) to the first BS only if the RACH configuration initially suggested by the first BS leads to conflicts and an unsuccessful RACH procedure with the first BS. In an aspect, the second BS transmits the second configuration to the first BS after the second BS has unsuccessfully attempted at least one RACH procedure with the first BS as a result of conflicting PRACH occasions with the second set of signals. In response to the transmitted configuration of signals scheduled for the second BS, the second BS may receive a new RACH configuration from the first BS avoiding conflicts with the second BS's own transmissions. The second BS may initiate the RACH procedure based on the new RACH configuration.

In an aspect, the first BS may receive the second configuration from at least one of directly from the second BS on a low frequency wireless link between the first BS and the second BS, a parent BS of the second BS, or a donor BS of the second BS.

In an example scenario, the RACH configuration of the first BS may have configured PRACH resources in every 5$^{th}$ slot, for example, slots 4, 9, 14, 19, 24 . . . 39 of the 40 slots per frame for 60 KHz carrier spacing. If the second BS has configured other signals in slots 4, 14 and 24, the first BS reconfigures its RACH configuration to a RACH configuration that does not have PRACH occasions in slots 4, 14, and 24.

In certain aspects, the target ANF node, instead of changing its RACH configuration, invalidates one or more RACH occasions that conflict with one or more signals of the UEF node.

Figure 9:
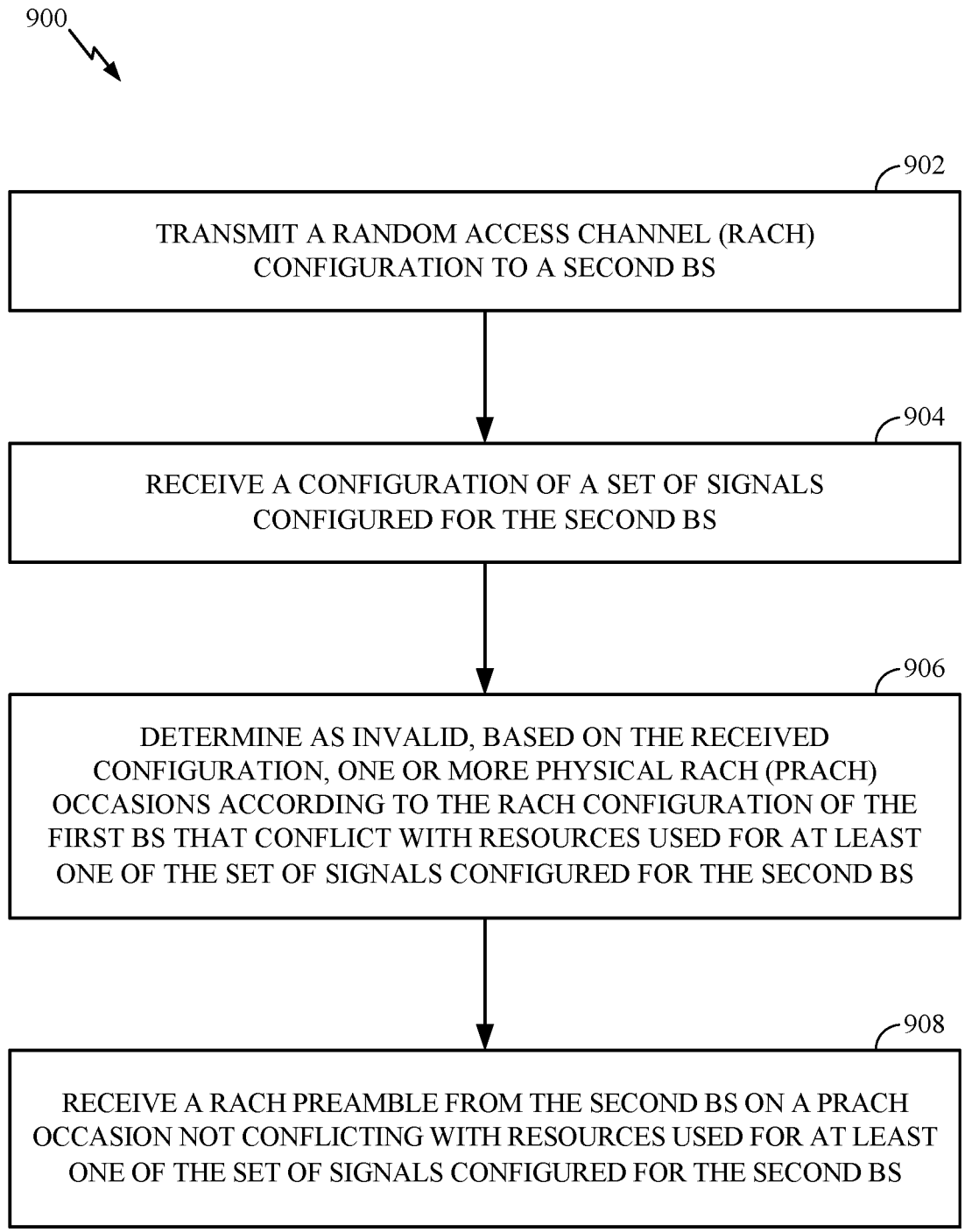
FIG. 9 illustrates example operations 900 performed by a first BS (e.g., a target ANF node) for avoiding conflicts between RACH signals and other signals in an IAB network, in accordance with certain aspects of the present disclosure.

FIG. 9 illustrates example operations 900 performed by a first BS (e.g., a target ANF node) for avoiding conflicts between RACH signals and other signals in an IAB network, in accordance with certain aspects of the present disclosure.

Operations 900 begin, at 902, by transmitting a RACH configuration to a second BS. In an aspect, the second BS is a UEF node, wherein the second BS is to handover from a source BS (e.g., a source ANF node) to the first BS. In an aspect, the first BS transmits the RACH configuration to the second BS via a parent BS (e.g., a source ANF node) of the second BS.

At 904, the first BS receives a configuration of a set of signals configured for the second BS. In an aspect, the signals include one or more uplink and/or downlink signals configured for an access link between the second BS and at least one UE or UEF node served by the second BS. In an aspect, the set of signals includes at least one of uplink transmissions, a primary synchronization signal, a secondary synchronization signal, a PBCH signal, remaining minimum system information, other system information, random access response from one or more UEs, Channel State Information Reference Signals (CSI-RS), or paging signals.

At 906, the first BS determines as invalid, based on the received configuration, one or more PRACH occasions according to the RACH configuration of the first BS that conflict with resources used for at least one of the set of signals configured for the second BS.

At 908, the first BS receives a RACH preamble from the second BS on one or more PRACH occasions not conflicting with resources used for at least one of the set of signals configured for the second BS. In an aspect, the resources include time and/or frequency resources.

In an aspect, the second BS is configured to determine one or more PRACH occasions that conflict the set of signals configured for the second BS are invalid, and not transmit a RACH preamble using the invalid PRACH resources. Additionally or alternatively, the second BS may be signaled (e.g, via RRC signaling) the RACH resources that are invalid, for example by the first BS over a low frequency link or by a parent BS (e.g., source ANF node) serving the second BS. In an aspect, once the second BS determines the invalid RACH resources, the second BS transmits a RACH preamble using one or more PRACH resources not determined as invalid.

In an example scenario, the RACH configuration of the first BS may have configured PRACH resources in every 5$^{th}$ slot, for example, slots 4, 9, 14, 19, 24 . . . 39 of the 40 slots per frame for 60 KHz carrier spacing. If the second BS has configured other signals in slots 4, 14 and 24, the first BS and the second BS determine that the PRACH occasions in slots 4, 14, and 24 are invalid. The second BS may transmit a RACH preamble using any of the PRACH occasions in slots 9, 19, 29 and so on.

In certain aspects, RACH transmissions in a backhaul link between two IAB nodes may arrive at a neighboring cell after a delay. This may cause interference to transmissions on an access link within the neighboring cell. For example, in the IAB network 700, IAB node 704e may transmit a RACH preamble to IAB node 704g in symbol N. However, this RACH signal may reach the UE 706e served by IAB node 704c after a delay of one or more symbols. In an aspect, while the IAB node 704c may have scheduled its downlink signals to UE 706e to not conflict with the RACH preamble in symbol N, the IAB node 704c may schedule downlink signals in one or more symbols right after the RACH preamble transmission in symbol N. However, since the RACH signal transmitted in the symbol N by IAB node 704e may reach UE 706e one or more symbols later (e.g., symbol N+1 or later), the RACH signal may interfere with the downlink signals transmitted by the IAB node 704c in one or more symbols after the symbol N.

In certain aspects, similar to the inter cell interference case noted above, a RACH signal transmitted by one UE in symbol N within a cell may interfere with downlink transmissions in symbol N+1 or later to another UE of the same cell or another UEF node. For example, a RACH preamble transmitted by a UE in symbol N may reach another UE of the same cell with a delay in symbol N+1 or a little later and may interfere with a downlink signal transmitted to the other UE in symbol N+1 or a little later.

In certain aspects, a serving IAB node may consider X symbols after a RACH occasion invalid for transmission on one of its access links and/or backhaul links, to avoid interference with the RACH signals transmitted during the RACH occasion. In an aspect, the value of X may be fixed in the specification or configured in system information or handover command by the network.

For example, if the serving IAB node has scheduled downlink transmissions (e.g, PDCCH transmissions) in first few symbols of slots 2, 4, 6, and 8, and knows that a PRACH occasion is configured towards the end of slot 3, the serving IAB node may determine the first few symbols of slot 4 invalid for the downlink transmissions, to avoid interference from a RACH preamble transmitted in the PRACH occasion in slot 3.

Figure 10:
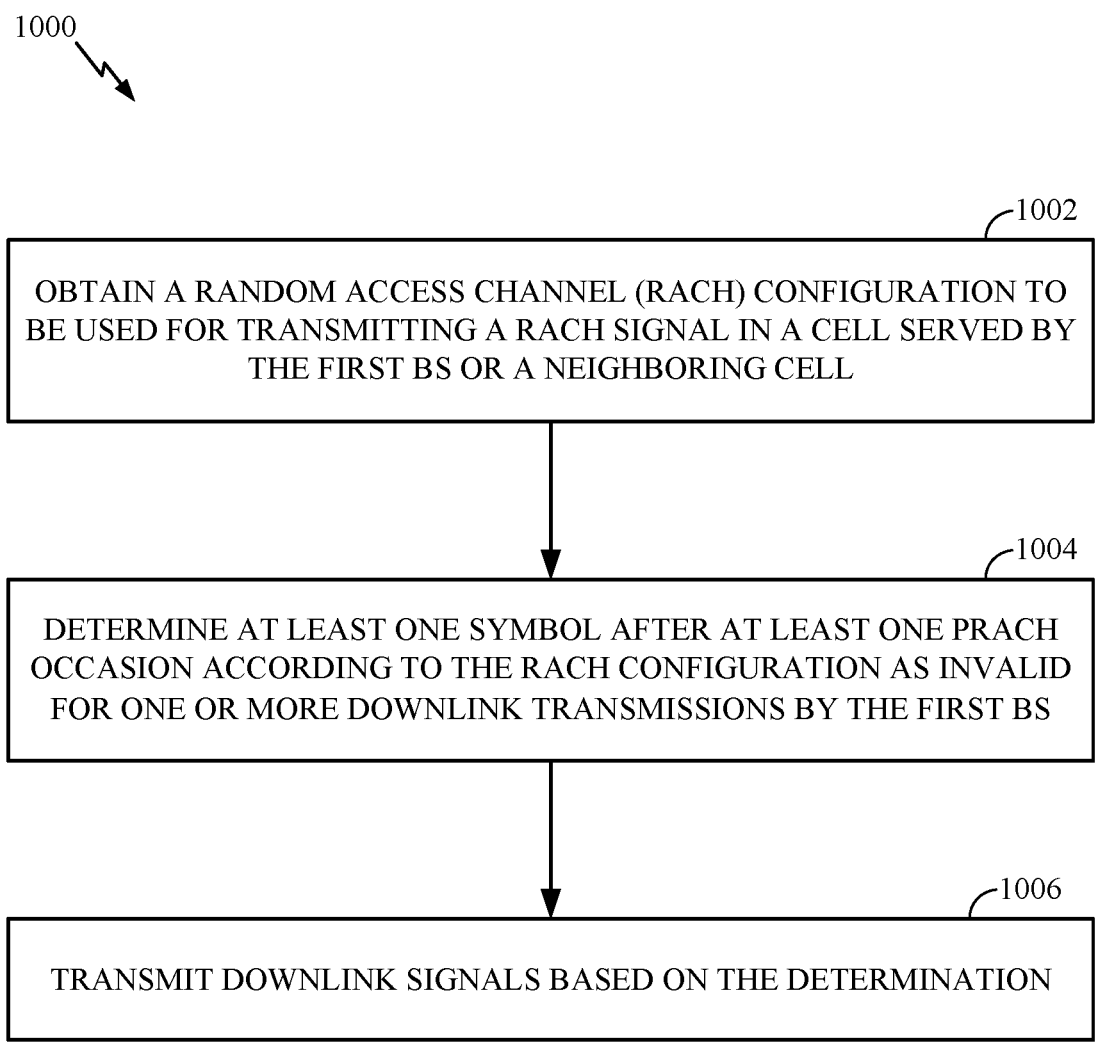
FIG. 10 illustrates example operations 1000 performed by a first BS (e.g, IAB node), for avoiding interference from RACH signals transmitted in a neighboring backhaul link, in accordance with certain aspects of the present disclosure.

FIG. 10 illustrates example operations 1000 performed by a first BS (e.g., IAB node), for avoiding interference from RACH signals transmitted in a neighboring backhaul link, in accordance with certain aspects of the present disclosure.

Operations 1000 begin, at 1002, by obtaining a RACH configuration to be used for transmitting a RACH signal in a cell served by the first BS or a neighbor cell.

At 1004, the first BS determines at least one symbol after at least one PRACH occasion according to the RACH configuration as invalid for one or more downlink transmissions by the first BS, for example, to avoid interference to the downlink transmissions from the RACH signal. In an aspect, the RACH signal transmitted in the at least one PRACH occasion may interfere with the downlink transmissions by the first BS in the at least one symbol after the at least one PRACH occasion.

At 1006, the first BS transmits downlink signals based on the determination. For example, the first base station does not transmit downlink signals during the determined at least symbol to one or more UEs on respective access links or one or more other IAB nodes on respective backhaul links, to avoid interference from the RACH signal.

In an aspect, the RACH signal is to be transmitted by a second BS (e.g., UEF node) in the neighboring cell to a third BS using the at least one PRACH occasion. The second BS may be in a vicinity of at least one of the first BS, a User Equipment (UE) served by the first BS, or another BS (e.g., UEF node) served by the first BS.

In an aspect, the RACH signal is to be transmitted by another UE served by the first BS using the at least one PRACH occasion.

In an aspect, the at least one symbol is a default value.

In an aspect, the at least one symbol is configured by the network and the first BS receives the configured at least one symbol from the network. In an aspect, the network configures the at least one symbol via at least one of RMSI, OSI, DCI, RRC signaling, MAC-CE or a handover message.

In an aspect, the first and the second BSs are same.

Figure 11:
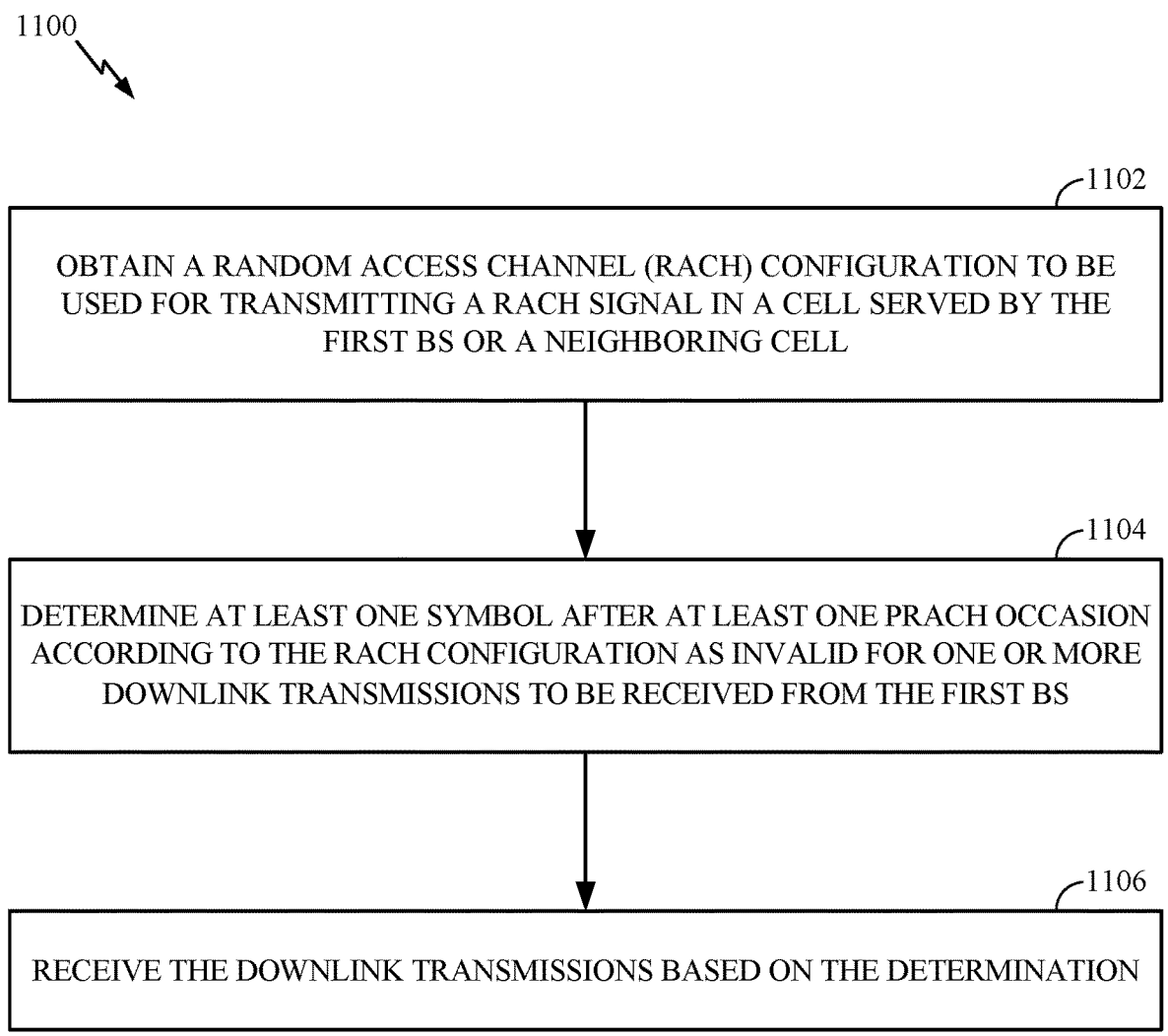
FIG. 11 illustrates example operations 1100 performed by a UE served by the first BS of FIG. 10, for avoiding interference from RACH signals transmitted in a neighboring backhaul link, in accordance with certain aspects of the present disclosure.

FIG. 11 illustrates example operations 1100 performed by a UE served by the first BS of FIG. 10, for avoiding interference from RACH signals transmitted in a neighboring backhaul link, in accordance with certain aspects of the present disclosure.

Operations 1100 begin, at 1102, by obtaining a RACH configuration to be used for transmitting a RACH signal in a cell served by the first BS or a neighboring cell.

At 1104, the UE determines at least one symbol after at least one PRACH occasion according to the RACH configuration as invalid for one or more downlink transmissions to be received from the first BS, for example, to avoid interference to the downlink transmissions from the RACH signal. In an aspect, the RACH signal transmitted in the at least one PRACH occasion may interfere with the downlink transmissions by the first BS in the at least one symbol after the at least one PRACH occasion At 1106, the UE receives the downlink transmissions based on the determination. For example, the UE receives the downlink transmissions on one or more downlink symbols not determined as invalid.

In an aspect, the RACH signal is to be transmitted by a second BS (e.g., UEF node) in the neighboring cell to a third BS (e.g., ANF node) using the at least one PRACH occasion. In an aspect, the second BS in in a vicinity of the UE.

In an aspect, the RACH signal is to be transmitted by another UE served by the first BS using the at least one PRACH occasion.

In an aspect, the at least one symbol is a default value.

In an aspect, the at least one symbol is configured by the network and the UE receives the configured at least one symbol from the first BS.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 8-11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a first Base Station (BS), comprising:
   transmitting a random access channel (RACH) configuration to a second BS;
   receiving a configuration of a set of signals configured for the second BS;
   determining as invalid, based on the received configuration, one or more Physical RACH (PRACH) occasions according to the RACH configuration of the first BS that conflict with resources used for at least one of the set of signals configured for the second BS; and
   receiving a RACH preamble from the second BS on a PRACH occasion not conflicting with resources used for at least one of the set of signals configured for the second BS.

2. The method of claim 1, wherein the transmitting comprises transmitting the RACH configuration to the second BS via a parent BS of the second BS.

3. The method of claim 1, wherein the resources used for the at least one of the set of signals comprise time resources.

4. The method of claim 1, wherein the resources used for the at least one of the set of signals comprise time and frequency resources.

5. The method of claim 1, wherein the set of signals comprises one or more uplink transmissions configured for an access link between the second BS and a UE served by the second BS.

6. The method of claim 1, wherein the set of signals comprises one or more downlink transmissions configured for an access link between the second BS and a UE served by the second BS.

7. The method of claim 1, wherein the set of signals comprises at least one of uplink transmissions, a primary synchronization signal, a secondary synchronization signal, a PBCH signal, remaining minimum system information, other system information, random access response from one or more UEs, Channel State Information Reference Signals (CSI-RS), or paging signals.

8. The method of claim 1, wherein the first BS comprises a first Integrated Access and Backhaul (IAB) node of an IAB network and the second BS comprises a second IAB node of the IAB network, wherein an access node (AN) function of the first IAB node is to perform a RACH procedure with a User Equipment (UE) function of the second IAB node over a wireless backhaul link between the first IAB node and the second IAB node, and wherein performing the RACH procedure includes receiving the RACH preamble.

9. A method for wireless communication by a first Base Station (BS), comprising:
   obtaining a Random Access Channel (RACH) configuration to be used for transmitting a RACH signal in a cell served by the first BS or in a neighboring cell;
   determining at least one symbol after at least one PRACH occasion according to the RACH configuration as invalid for one or more downlink transmissions by the first BS; and
   transmitting the one or more downlink transmissions based on the determination.

10. The method of claim 9, wherein determining the at least one symbol as invalid for the one or more downlink transmissions avoids interference to the one or more downlink transmissions from the RACH signal.

11. The method of claim 9, wherein determining the at least one symbol after the at least one PRACH occasion according to the RACH configuration as invalid comprises determining the RACH signal is to be transmitted by a second BS in the neighboring cell using the at least one PRACH occasion.

12. The method of claim 11, wherein the second BS is in a vicinity of at least one of the first BS, a User Equipment (UE) served by the first BS, or another BS served by the first BS.

13. The method of claim 9, wherein determining the at least one symbol after the at least one PRACH occasion according to the RACH configuration as invalid comprises determining the RACH signal is to be transmitted by a User Equipment (UE) served by the first BS using the at least one PRACH occasion.

14. The method of claim 9, wherein determining the at least one symbol after the at least one PRACH occasion according to the RACH configuration as invalid comprises determining the RACH signal transmitted in the at least one PRACH occasion is to interfere with the one or more downlink transmissions by the first BS in the at least one symbol after the at least one PRACH occasion.

15. The method of claim 9, wherein the one or more downlink transmissions comprise one or more downlink transmissions on at least one of an access link to at least one User Equipment (UE) or a wireless backhaul link to another BS.

16. The method of claim 9, wherein determining the at least one symbol comprises determining a default symbol.

17. The method of claim 9, wherein determining the at least one symbol comprising receiving a configuration from a network configuring the at least one symbol.

18. The method of claim 17, where receiving the configuration from the network comprises receiving the configuration via at least one of remaining system information (RMSI), other system information (OSI), downlink control information (DCI), radio resource control (RRC) signaling, a medium access control control element (MAC-CE), or a handover message.

19. A method for wireless communication by a User Equipment (UE) served by a first Base Station (BS), comprising:
   obtaining a Random Access Channel (RACH) configuration to be used for transmitting a RACH signal in a cell served by the first BS or in a neighboring cell;
   determining at least one symbol after at least one PRACH occasion according to the RACH configuration as invalid for one or more downlink transmissions to be received from the first BS; and
   receiving the one or more downlink transmissions from the first BS based on the determination.

20. The method of claim 19, wherein determining the at least one symbol as invalid for the one or more downlink transmissions avoids interference to the one or more downlink transmissions from the RACH signal.

* * * * *